(12) United States Patent
Brunner et al.

(10) Patent No.: US 11,592,409 B2
(45) Date of Patent: Feb. 28, 2023

(54) METHOD AND SYSTEM FOR SLURRY PIPE LINER WEAR MONITORING

(71) Applicant: REI, Inc., Salt Lake City, UT (US)

(72) Inventors: Daniel J. Brunner, Salt Lake City, UT (US); Alex Schumacher, Bountiful, UT (US); Randy Richardson, South Jordan, UT (US); Randall Johnson, Murray, UT (US)

(73) Assignee: REI, Inc., Sall Lake City, UT (US)

( * ) Notice: Subject to any disclaimer, the term of this patent is extended or adjusted under 35 U.S.C. 154(b) by 0 days.

(21) Appl. No.: 17/360,739

(22) Filed: Jun. 28, 2021

(65) Prior Publication Data

US 2021/0325327 A1   Oct. 21, 2021

Related U.S. Application Data

(63) Continuation of application No. 16/526,036, filed on Jul. 30, 2019, now Pat. No. 11,073,489.

(60) Provisional application No. 62/712,535, filed on Jul. 31, 2018.

(51) Int. Cl.
*H04Q 9/00* (2006.01)
*G01N 27/02* (2006.01)
*G01N 27/04* (2006.01)

(52) U.S. Cl.
CPC ............ *G01N 27/028* (2013.01); *H04Q 9/00* (2013.01); *G01N 27/041* (2013.01); *H04Q 2209/40* (2013.01); *H04Q 2209/886* (2013.01)

(58) Field of Classification Search
CPC ............................ G01N 27/028; H04Q 9/00
See application file for complete search history.

(56) References Cited

U.S. PATENT DOCUMENTS

| | | | |
|---|---|---|---|
| 4,838,086 A * | 6/1989 | Bender | G01B 17/02 73/901 |
| 5,634,497 A | 6/1997 | Neto | |
| 9,759,556 B2 * | 9/2017 | Davis | G01N 29/44 |
| 2004/0065377 A1 * | 4/2004 | Whiteley | F16L 11/127 138/104 |
| 2007/0267082 A1 | 11/2007 | Brandys et al. | |
| 2008/0236286 A1 * | 10/2008 | Lam | G01N 29/2437 73/618 |
| 2018/0172605 A1 | 6/2018 | Brunner et al. | |
| 2018/0313707 A1 | 11/2018 | Schumacher et al. | |
| 2019/0073827 A1 * | 3/2019 | Coronado | G06T 19/006 |
| 2019/0093830 A1 * | 3/2019 | Hughes | G01N 27/041 |
| 2020/0041433 A1 | 2/2020 | Brunner et al. | |

* cited by examiner

*Primary Examiner* — Qutbuddin Ghulamali
(74) *Attorney, Agent, or Firm* — Shackelford, Bowen, McKinley & Norton, LLP; David L. Odom; Stanley R. Moore (57) ABSTRACT

A system includes a slurry pipe and a pipe liner disposed within an inner diameter of the slurry pipe. At least one redundant transducer wear ladder sensor is disposed within the pipe liner. A computer controller is operatively coupled to the at least one redundant transducer wear ladder sensor via a flexible ribbon cable. A radio-wave transmitter is operatively coupled to the computer controller. A radio-wave receiver is operatively coupled to the computer controller. A power source is operatively coupled to the radio-wave transmitter and to the radio-wave receiver.

10 Claims, 7 Drawing Sheets

METHOD AND SYSTEM FOR SLURRY PIPE LINER WEAR MONITORING

CROSS-REFERENCE TO RELATED APPLICATIONS

This application is a continuation of, and incorporates by reference for any purpose, U.S. patent application Ser. No. 16/526,036, filed on Jul. 30, 2019. U.S. patent application Ser. No. 16/526,036 claims priority to, and incorporates by reference for any purpose, U.S. Provisional Patent Application No. 62/712,535, filed on Jul. 31, 2018. U.S. patent application Ser. No. 15/496,747, filed Apr. 25, 2017, U.S. patent application Ser. No. 15/730,465, filed Oct. 11, 2017, and U.S. patent application Ser. No. 15/967,932, filed May 1, 2018 are each incorporated herein by reference in their entireties.

TECHNICAL FIELD

The present invention relates generally to surface wear monitoring, and more particularly, but not by way of limitation, to wear monitoring of slurry pipeline liners.

BACKGROUND

Slurry pipelines are used to transport commodities such as oil sands over long distances by forces of gravity, pumping, or other mechanical means. Slurries are often abrasive and cause excessive and non-uniform wear on the slurry pipelines. Such wear causes costly maintenance and down time. Polymer or ceramic slurry pipe liners are used to extend the life and reduce the maintenance requirements of slurry pipelines. Even where slurry pipe liners are used, efficient maintenance scheduling is necessary to minimize costs. Currently, maintenance is scheduled conservatively based off of empirical data, such as the typical lifetime of a pipe liner. A more highly accurate and technological means is needed to determine pipe liner wear in (effectively) real time to more efficiently schedule maintenance such as the rotation of pipes and pipe and pipe liner replacement.

SUMMARY OF THE INVENTION

The Slurry Pipe Liner Wear Monitor (SPLWM) measures the wear depth of the slurry pipe liner with a high degree of resolution and sends measured data to a central computer system for tracking and analysis. In an example embodiment presented herein, the SPLWM can be installed by, for example, welding an external housing platform to an outer diameter of a pipe. In various embodiments, the SPLWM can include sensors, a controller, an antenna system, and a network and computer system.

BRIEF DESCRIPTION OF THE DRAWINGS

A more complete understanding of the present disclosure may be obtained by reference to the following Detailed Description when taken in conjunction with the accompanying Drawings wherein.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting.

Figure 1:
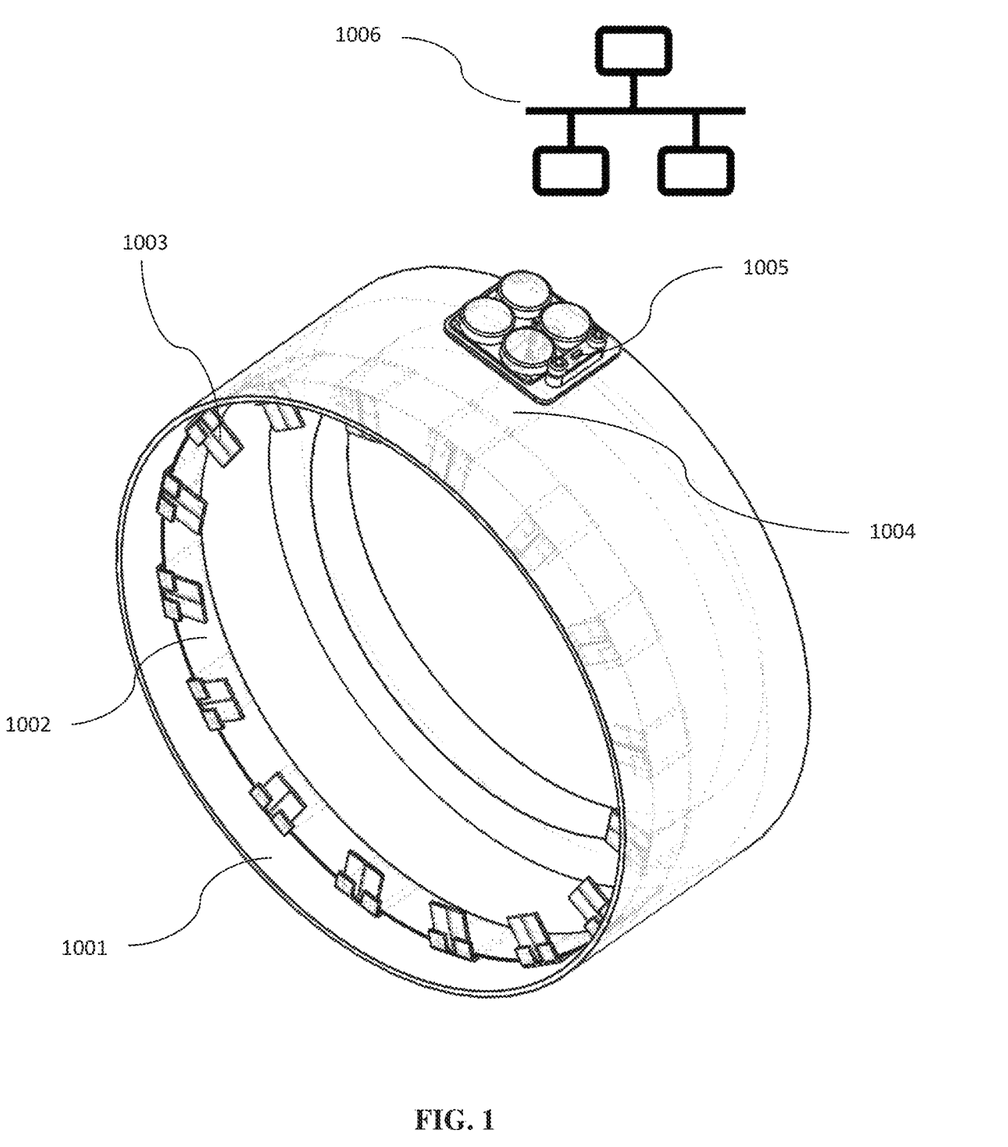
FIG. 1 illustrates an exemplary Slurry Pipe Liner Wear Monitor (SPLWM system.

The Slurry Pipe Liner Wear Monitor (SPLWM) measures the wear depth of a slurry pipe liner with a high degree of resolution and sends the data to a central computer system for tracking and analysis, System components, discussed in further detail below, include, but are not limited to a slurry pipe 1001, a slurry pipe liner 1002, sensors 1003, a controller 1004, an antenna system 1005, and a network and computer system 1006. An example of a SPLWM system is shown in FIG. 1. The slurry pipe liner 1002 may be constructed of any material such as, for example, ceramic or polymer.

Sensors

The sensors 1003 are made using redundant resistor wear monitor ladder sensors, such as those disclosed in U.S. patent application Ser. No. 15/496,747, incorporated herein by reference. In various embodiments, the sensors 1003 can be made with wear measurement precisions of, for example, about 0.15 mm (6 mils) (non-redundant). In some instances, for example in slurry pipes, the level of precision is not necessary because typical manufacturing and wear tolerances are much greater than this. For a redundant resistor setup, the precision may be set as small as about 0.30 mm (12 mils).

Flexible Ribbon Cable

Figure 2:
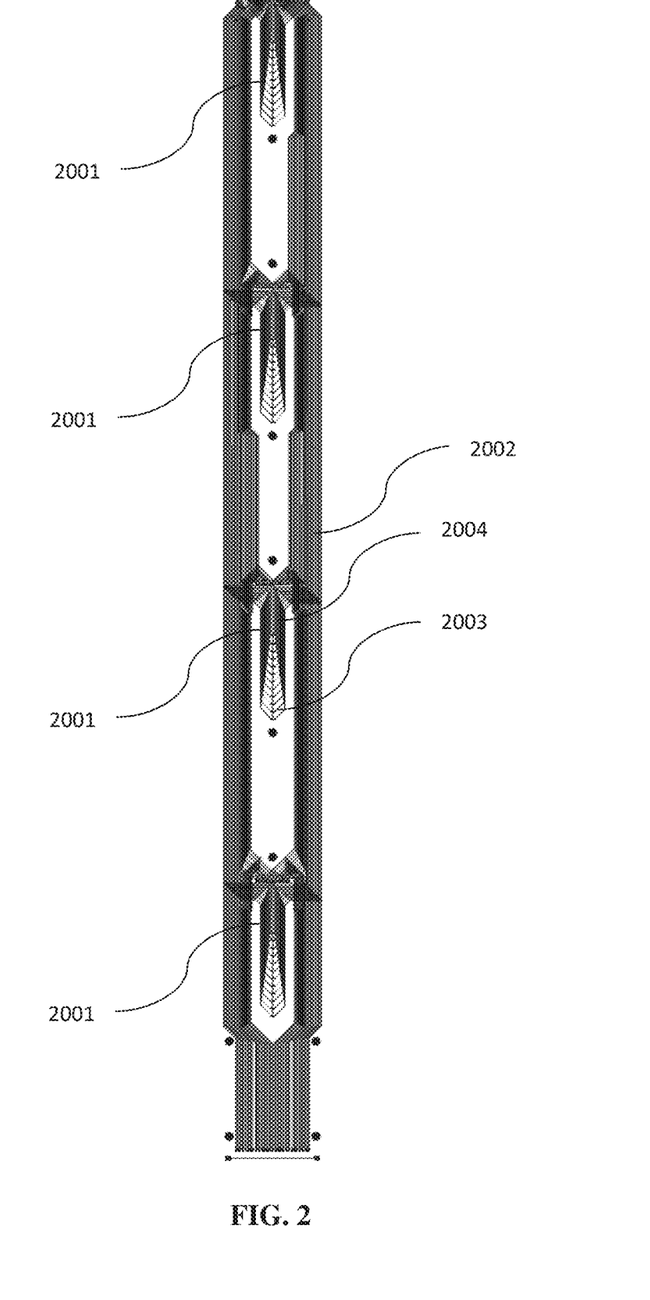
FIG. 2 illustrates a plurality of wear ladder sensors connected by a flexible ribbon cable according to aspects of the disclosure.
Figure 3:
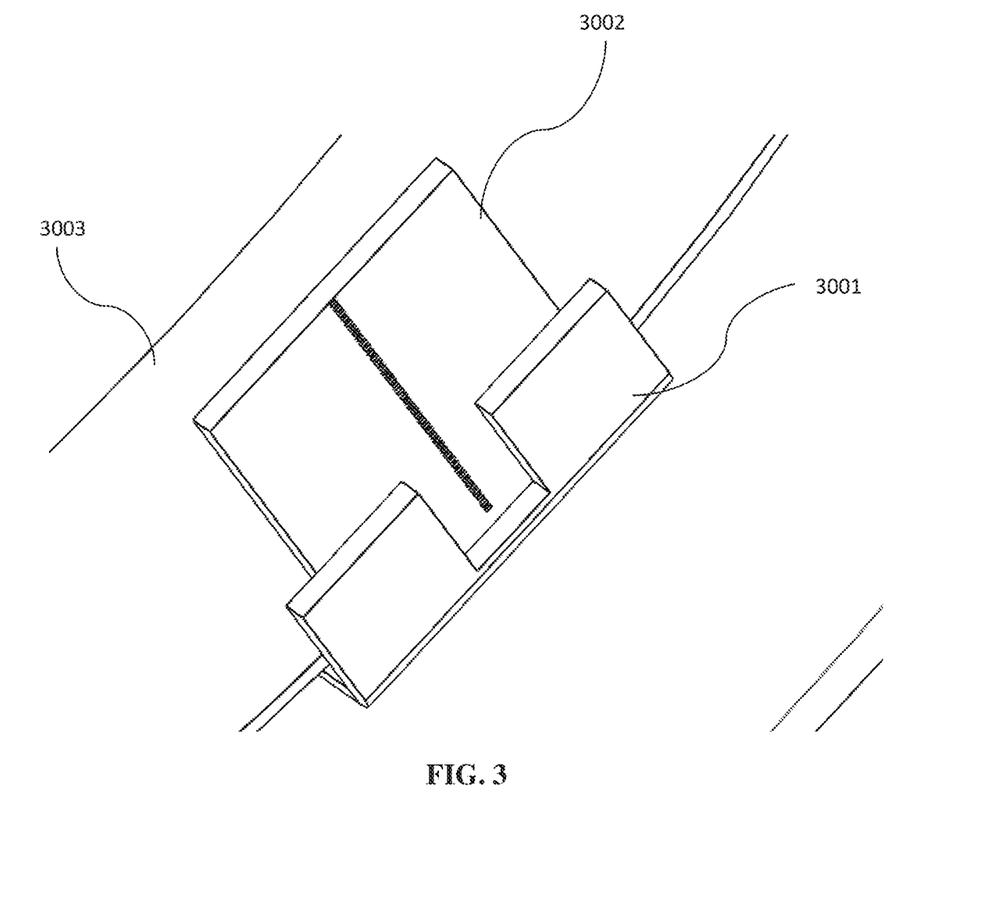
FIG. 3 illustrates an exemplary wear ladder sensor.

FIG. 2 illustrates the circuitry of a collection of four (4) wear ladder sensors 2001, Wear ladder sensors 2001 are positioned along the circumference of the pipe and are connected to one another using a thin, flexible ribbon cable 2002, Each trace of the flexible ribbon cable 2002 corresponds to a single transducer 2003 in the system of collection of wear ladder sensors 2001. The number of traces in the flexible ribbon cable 2002 is a function of the total number of wear ladder sensors 2001 per controller and number of transducers 2003 per sensor 2001. As shown in FIG. 3, a bracket 3001 is used to bend the sensors 3002 up from the plane of the flexible circuit cable 3003, The location of the bend 2004 is shown in FIG. 2. The flexible ribbon cable 2002 and sensor assembly may either be affixed to the slurry pipe 1001 and a polymer or ceramic pipe liner 1002 installed subsequently or the flexible ribbon cable 2002 and sensor assembly may be installed within the polymer or ceramic pipe liner 1002, which is then subsequently installed in the slurry pipe 1001.

Controller

Figure 4:
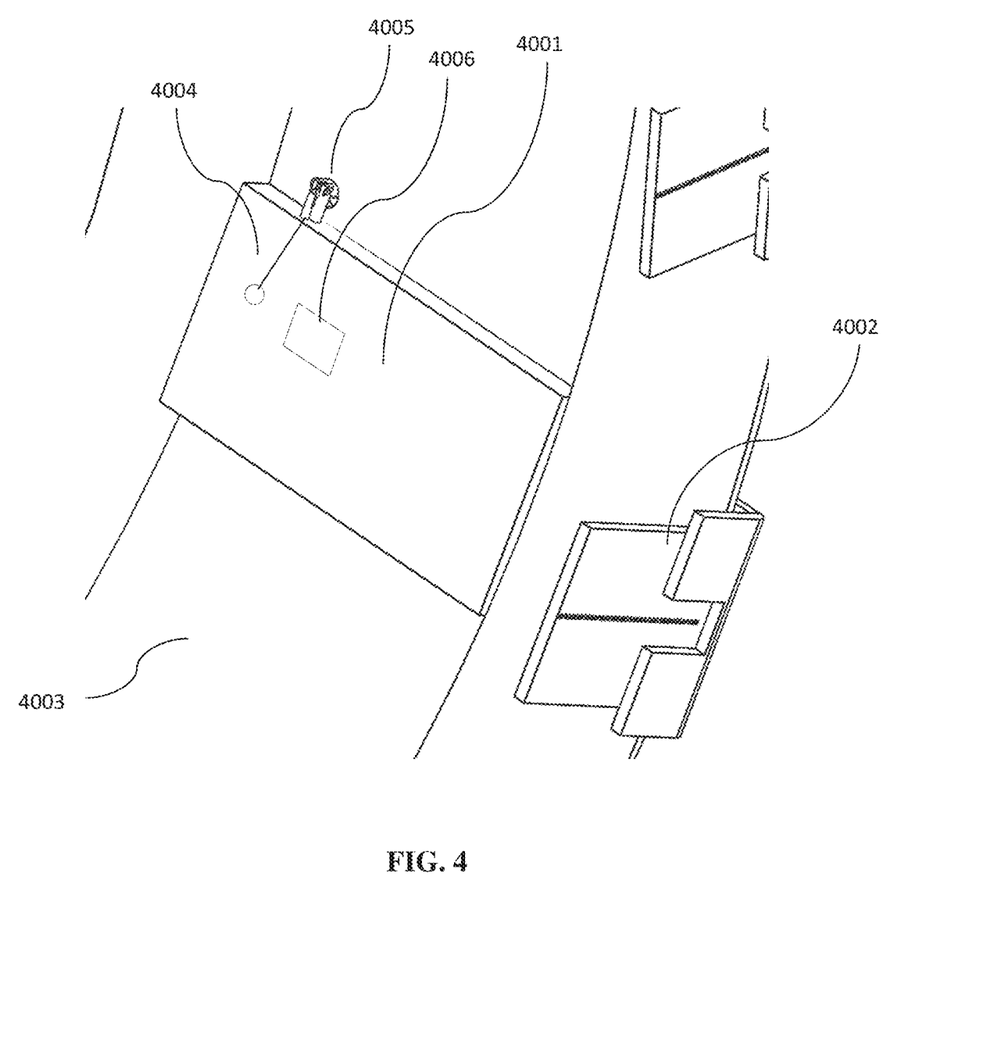
FIG. 4 illustrates an exemplary controller mounted to the inside diameter of a slurry pipe.

The thickness of the controller 1004 limits the depth which the wear of the liner 1002 can be measured to the depth to the controller circuit board with its thickest components. The controller 4001, as illustrated in FIG. 4, collects all signals from the sensors 4002 and processes the data into packets for network transmission. The controller has a built in radio transceiver 4006 (transmitter/receiver) that transmits the data packets through a coaxial cable 4004 to an antenna. 1005 mounted on the external surface of the pipe 4003 via a coaxial cable 4004 routed through a small diameter hole 4005 in the pipe 4003. Commands from the computer system 1006 may also be received by the controller 4001 from the external antenna 1005 for functions such as software updates or parameter adjustments.

Antenna System

Figure 5:
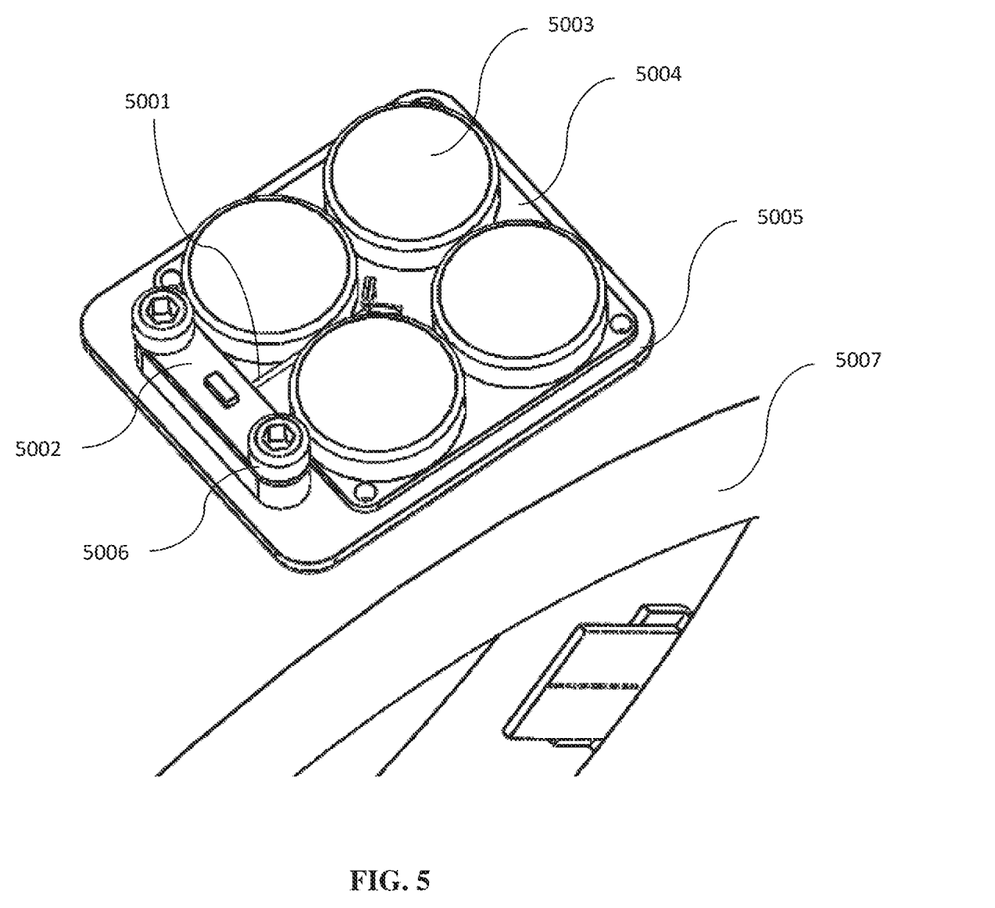
FIG. 5 illustrates an exemplary antenna board with power source mounted to the outside diameter of a slurry pipe.

The antenna system 1005 includes a coaxial cable 5001 and an antenna circuit board 5002, a power source 5003, a power-source circuit board 5004, and a mounting frame 5005 as shown in FIG. 5, A recessed-reflector antenna circuit board 5002, such as those disclosed in U.S. patent application Ser. No. 15/496,747, incorporated herein by reference, is attached with, for example, two screws 5006 to a frame 5005 that is mounted to the outside of a pipe 5007. The antenna circuit board 5002 and power-source circuit board 5004 are covered with a weather resistant housing (not shown) that allows radio signals to pass without significant attenuation. The antennas 5002 have a maximum range of about 100 meters, but, in various embodiments, can be less depending on the environment. The antenna mounting 5005 serves the following purposes: (1) provide an antenna and power source attachment, as shown in FIG. 5; and (2) provide pipe strength compensation for material removed by drilling the hole 4005 through the pipe 5007. The antenna circuit board 5002 contains a small chip antenna and radio signal impedance tuning components. In various embodiments, the power source 5003 may be at least one of, for example, a battery, a plurality of batteries, a solar cell, and a mechanical generator.

Network and Computer System

The antenna systems 1005 mounted to the slurry pipes 1001 have a maximum range of up to about 100 meters, depending on the environment. Repeaters are used to collect signals from the antennas 5002 and boost the signals to be transmitted for much longer distances (e.g., miles). The computer system 1006 collects the data from the receivers and runs an application to process and display the information.

Figure 6:
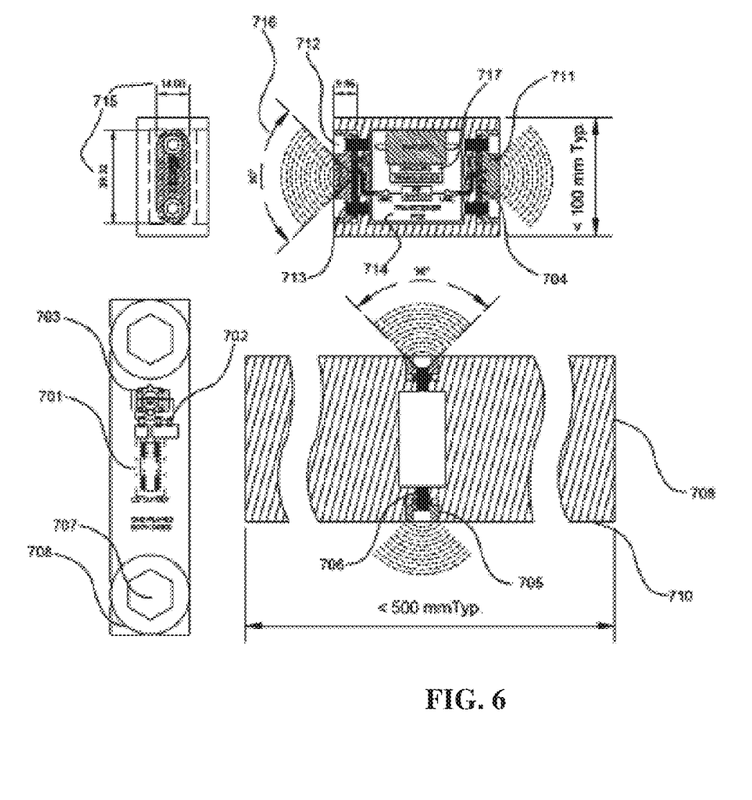
FIG. 6 illustrates a dual-sided embodiment of a remote recessed reflector antenna according to aspects of the disclosure.

An example embodiment of remote dual antennas with recessed reflectors is shown in FIG. 6. The antenna 701, series and shunt tuning components 702, and cable connector 703 are mounted on a small circuit board 704 that is positioned in the antenna cavity 705 with two mounting holes 707 aligned with threaded screw holes 706 in the bottom of the antenna cavity 705. The bottom sides of the two screw holes 706 in the circuit board 704 have exposed annular rings 708 that are conductively bonded to the steel surface of the bottom of the cavity 705 using an electrically conductive compound. This conductive joint between the grounded PCB 704 annular rings 708 extends the circuit board 704 ground plane into the steel chassis 709. The extended ground plane acts as the reflector for the antenna 701. The current means of mounting these types of antennas is on the edges of flat corner surface reflectors. Mounting the antenna 701 on flat surface corner reflectors is not possible on flat surfaces because the surfaces 710 are exposed to a harsh environment (the antenna 701 would eventually be destroyed). Recessing the antenna 701 into the surface prevents it from being damaged or scraped off the surface on traveled, wear, or aerodynamic surfaces.

The antenna 701 and circuit board 704 is further protected with a cover 711 formed out of a material (such as, for example, PTFE) that fills the cavity 705 in front of the antenna 701 and is attached by means of two screws 712. Connectors 703 are attached to RF cables 713. RF cables 713 carry signals to and from the transceiver and processing circuit board 714 which may contain on-board sensors 717. Dimensions 715 of the cavity 705 allow the radiation pattern 716 to be modified by altering the dimensions 715, when practical. This set of cavity 705 dimensions 715 is specific to this example and may be altered, as required, for similar embodiments. Recessing the antenna 701 and changing the dimensions 715 of the cavity 705 changes the radiation characteristics from an omnidirectional configuration that is characteristic of radiation reflected off of a horn antenna. These changes will make the antenna beam (716) operate in a directional pattern.

Figure 7:
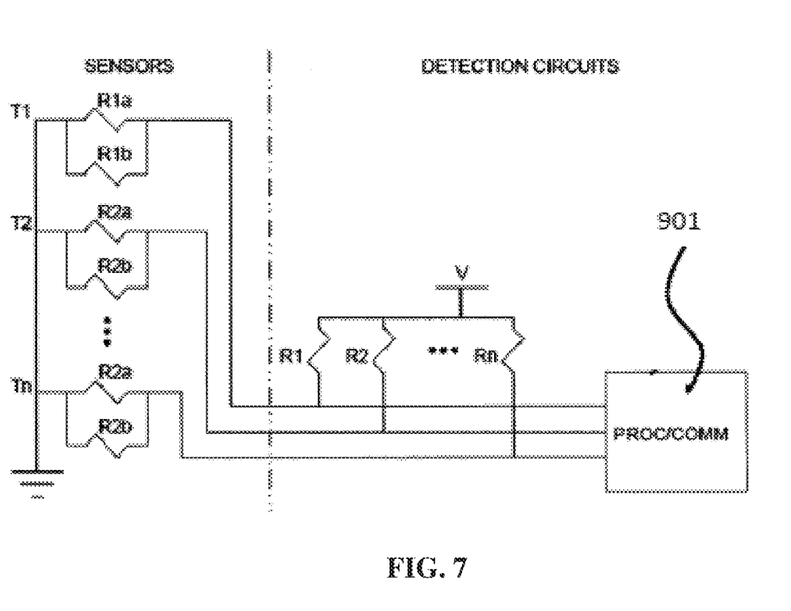
FIG. 7 illustrates a circuit diagram for a wear detector according to aspects of the disclosure.

FIG. 7 is a circuit diagram of a wear detector according to an exemplary embodiment, Although embodiments are not limited to a specific type of transducer, the use of resistor pairs (redundant resistors) for monitoring is discussed herein as an example. A first resistor pair T1, having resistors R1$a$ and R1$b$, is embedded nearest the outer wear surface with a second resistor pair T2, having resistors R2$a$ and R2$b$, through resistor pair Tn equally spaced along the wear path. The resistor pair Tn is located closest to the wear limit. When a new surface, such as, for example, a the slurry pipe wear liner 1002, wears down to a resistor pair, such as R1$a$ and R1$b$, a combinatorial resistance changes. The resistance can be reduced or shorted (if filled with mud) or increased or open (if the connections or resistor are damaged or broken). The change in resistance indicates to a processing device 901 that a wear depth corresponding to a particular resistor pair has been reached. Although not shown in FIG. 7, circuit traces may also be made redundant by use of more traces and circuit board layers to decrease the probability of false indications due to faulty trace failures.

Redundant transducers and traces improve the monitoring reliability of the wear detector. Single component, connection or trace failures resulting from defects in manufacturing, extremes in temperature, shock or vibration of the operating environment are detected and compensated for in the processing circuitry of the processing device 901. For example, if the parallel combination of the resistors R1$a$ and R1$b$ equals the value of the resistor R1, then the analog voltage detected at the processing device 901 is V/2. If a failure of the resistor R1$a$, the resistor R1$b$, or a connection or trace path to either of these resistors results, due to a manufacturing fault, temperature extremes, or from shock or vibration, one of the resistors R1$a$ or R1$b$ will be omitted from the circuit. Omission of one of the resistors R1$a$ or R1$b$ will result in the resistance of the resistor R1 being ½ the resistance of the remaining connected resistor (R1$a$ or R1$b$). The voltage detected at the processing device 901 will then be V/3. This voltage level will indicate to the processing device 901 that the failure may not be related to wear. If the voltage level is due to wear, it will not make a difference as the other resistor R1$a$ or R1$b$ will soon be removed by wear. Until both the resistors R1$a$ and R1$b$ in the pair are faulted, the wear-point will not be considered, by the processing device 901, to have been reached. In wear detectors that do not have redundancy, failures in any of the traces or transducer will incorrectly indicate that a wear point was reached. This is an example of direct wear monitoring.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially." "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein, Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an," and other singular terms are intended to include the plural forms thereof unless specifically excluded.

What is claimed is:

1. A system for wear monitoring, comprising:
   a slurry pipe;
   a pipe liner disposed within an inner diameter of the slurry pipe; and
   at least one wear ladder sensor disposed within the pipe liner, each of the at least one wear ladder sensor comprising a plurality of traces corresponding to a plurality of transducers spaced along a wear path, the plurality of transducers comprising at least one transducer at each of a plurality of wear depths, each trace of the plurality of traces being independent from each other trace of the plurality of traces.

2. The system for wear monitoring of claim 1, wherein electrical properties of the wear ladder are related to a length of the wear ladder, which is related to a thickness of the pipe liner.

3. The system for wear monitoring of claim 1, comprising a computer controller operatively coupled to each of the at least one wear ladder sensor via a flexible ribbon cable.

4. The system for wear monitoring of claim 3, wherein the flexible ribbon cable can be routed to monitor any point within a structure of the pipe liner.

5. The system for wear monitoring of claim 3, wherein electrical properties of the wear ladder are analyzed by the computer controller.

6. The system for wear monitoring of claim 3, comprising:
   a radio-wave transmitter operatively coupled to the computer controller; and
   a radio-wave receiver operatively coupled to the computer controller.

7. The system for wear monitoring of claim 6, wherein the controller communicates electrical properties of the wear ladder to the radio-wave receiver via the radio-wave transmitter and pipe liner wear is inferred.

8. The system for wear monitoring of claim 6, wherein the radio-wave transmitter acts as a radio-wave repeater.

9. The system for wear monitoring of claim 1 wherein, for each wear depth of the plurality of wear depths, the at least one transducer comprises a first transducer and a second transducer.

10. The system for wear monitoring of claim 1, wherein the at least one wear ladder sensor comprises a plurality of wear ladder sensors.

\* \* \* \* \*